US012608530B2

(12) United States Patent
Yu et al.

(10) Patent No.: US 12,608,530 B2
(45) Date of Patent: Apr. 21, 2026

(54) INTEGRATED CIRCUIT INCLUDING STANDARD CELL AND METHOD OF MANUFACTURING THE INTEGRATED CIRCUIT

(71) Applicant: SAMSUNG ELECTRONICS CO., LTD., Suwon-si (KR)

(72) Inventors: Jisu Yu, Seoul (KR); Jaeho Park, Suwon-si (KR); Sanghoon Baek, Seoul (KR); Hyeongyu You, Hwaseong-si (KR); Seungyoung Lee, Seoul (KR); Seungman Lim, Siheung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/670,009

(22) Filed: May 21, 2024

(65) Prior Publication Data

US 2024/0303410 A1 Sep. 12, 2024

Related U.S. Application Data

(62) Division of application No. 17/225,773, filed on Apr. 8, 2021, now Pat. No. 12,019,965.

(30) Foreign Application Priority Data

Apr. 23, 2020 (KR) ........................ 10-2020-0049484

(51) Int. Cl.
*G06F 30/392* (2020.01)
*G06F 30/3953* (2020.01)
(Continued)

(52) U.S. Cl.
CPC ........ *G06F 30/392* (2020.01); *G06F 30/3953* (2020.01); *G06F 30/398* (2020.01);
(Continued)

(58) Field of Classification Search
CPC ...................................................... G06F 30/392
(Continued)

(56) References Cited

U.S. PATENT DOCUMENTS 9,218,506 B2 12/2015 Tehranipoor et al.
10,050,028 B2 8/2018 Peng et al.
(Continued)

FOREIGN PATENT DOCUMENTS

KR 10-2017-0127340 A 11/2017
KR 10-2019-0004576 A 1/2019
KR 10-2019-0086925 A 7/2019

OTHER PUBLICATIONS

Office Action dated Dec. 18, 2024, issued by Korean Patent Office in Korean Patent Application No. 10-2020-0049484.
(Continued)

*Primary Examiner* — Eric D Lee
(74) *Attorney, Agent, or Firm* — Sughrue Mion, PLLC

(57) ABSTRACT

A method includes placing standard cells based on a standard cell library and generating layout data, and placing a filler cell selected from among a first type filler cell and a second type filler cell by using the layout data. The filler cell is placed based on a density of a pattern formed in the standard cell. The standard cell library includes data defining the first and second type filler cells. A density of a contact formed on an active region of the second type filler cell to contact the active region of the second type filler cell is lower than a density of a contact formed on an active region of a first type filler cell to contact the active region of the first type filler cell.

19 Claims, 13 Drawing Sheets

(51) Int. Cl.

| | |
|---|---|
| *G06F 30/398* | (2020.01) |
| *H01L 23/528* | (2006.01) |
| *H10D 64/27* | (2025.01) |
| *G06F 117/12* | (2020.01) |

(52) U.S. Cl.
CPC ...... *H01L 23/5283* (2013.01); *H01L 23/5286* (2013.01); *H10D 64/518* (2025.01); *G06F 2117/12* (2020.01)

(58) Field of Classification Search
USPC ........................................................ 716/119
See application file for complete search history.

(56) References Cited

U.S. PATENT DOCUMENTS

| | | | |
|---|---|---|---|
| 10,141,296 | B2 | 11/2018 | Hsieh et al. |
| 10,283,496 | B2 | 5/2019 | Lo et al. |
| 10,354,947 | B2 | 7/2019 | Kim et al. |
| 10,540,471 | B2 | 1/2020 | Chae et al. |
| 10,635,775 | B2 | 4/2020 | Lee et al. |
| 10,755,018 | B2 | 8/2020 | Ryu et al. |
| 2008/0120586 | A1 | 5/2008 | Hoerold |
| 2009/0113368 | A1* | 4/2009 | Lin ....................... G06F 30/398 716/122 |
| 2010/0258798 | A1* | 10/2010 | Sokel ..................... H01L 22/34 257/E27.001 |
| 2019/0012423 | A1 | 1/2019 | Lee et al. |
| 2019/0138682 | A1* | 5/2019 | Correale, Jr. .......... H10D 89/10 |

OTHER PUBLICATIONS

Communication dated Aug. 8, 2025, issued by the Korean Patent Office in Korean Application No. 10-2020-0049484.

\* cited by examiner

: Middle-Layer Pattern

: Middle-Layer Pattern

Y
↑
⊙——→X
Z

Legend:
- ▦ : Substrate
- ⌐⌐ : Cell Boundary
- ▨ : Power Rail
- ▧ : Gate Line
- ▓ : Active Region
- ▤ : Diffusion Break
- ▨ : Contact

INTEGRATED CIRCUIT INCLUDING STANDARD CELL AND METHOD OF MANUFACTURING THE INTEGRATED CIRCUIT

CROSS-REFERENCE TO RELATED APPLICATIONS

This application is a Divisional of U.S. application Ser. No. 17/225,773, filed on Apr. 8, 2021, which claims the benefit of Korean Patent Application No. 10-2020-0049484, filed on Apr. 23, 2020, in the Korean Intellectual Property Office, the disclosures of each of which being incorporated by reference herein in their entireties.

BACKGROUND

1. Field

The present disclosure relates to an integrated circuit, and more particularly, to an integrated circuit including a standard cell and a method of manufacturing the integrated circuit.

2. Description of Related Art

Integrated circuits may be designed based on standard cells. In detail, standard cells are placed based on data defining an integrated circuit, and a layout of the integrated circuit may be generated by routing the placed standard cells. As sizes of patterns in a standard cell may decrease, a size of the standard cell may be reduced. In integrated circuits, as a gate length of a device is progressively reduced, a density of lines for connecting semiconductor devices has increased.

SUMMARY

It is an aspect to provide an integrated circuit including a standard cell and a method of manufacturing the integrated circuit on the basis of a density of a pattern of a middle layer.

According to an aspect of an embodiment, there is provided a method comprising placing a plurality of standard cells based on a standard cell library including information about a standard cell, and generating layout data; and placing a filler cell selected from among a first type filler cell and a second type filler cell by using the layout data, the filler cell being placed based on a density of a pattern formed in the standard cell, wherein the standard cell library comprises data defining a plurality of filler cells, the plurality of filler cells comprising the first type filler cell in which an active region extending in a first direction is formed and the second type filler cell in which an active region extending in the first direction is formed, and a density of a contact formed on the active region of the second type filler cell to contact the active region of the second type filler cell is lower than a density of a contact formed on the active region of the first type filler cell to contact the active region of the first type filler cell.

According to another aspect of an embodiment, there is provided an integrated circuit comprising a plurality of standard cells defined by a cell boundary and connected to one another through a plurality of metal-layer patterns, wherein each of the plurality of standard cells comprises a plurality of function cells each including a logic circuit; and a plurality of filler cells, each placed adjacent to at least one of the plurality of function cells, each of the plurality of filler cells comprises one of a first type filler cell in which an active region extending in a first direction is formed and a second type filler cell in which an active region extending in the first direction is formed, and a density of a contact formed between a corresponding metal-layer pattern and the active region of the first type filler cell to contact the active region of the first type filler cell differs from a density of a contact formed between a corresponding metal-layer pattern and the active region of the second type filler cell to contact the active region of the second type filler cell.

According to yet another aspect of an embodiment, there is provided a method comprising placing a plurality of standard cells based on a standard cell library including data defining a plurality of filler cells including a first type filler cell and a second type filler cell; routing the plurality of standard cells to generate layout data; and placing a filler cell selected from among the first type filler cell and the second type filler cell by using the layout data, the filler cell being placed based on a density of a pattern formed in a corresponding standard cell, wherein each of the plurality of filler cells comprises a front-end layer in which a pattern configuring a transistor is formed; a back-end layer in which a pattern providing routing to another standard cell is formed; and a middle layer formed between the front-end layer and the back-end layer, and a density of a middle-layer pattern of the second type filler cell is lower than a density of a middle-layer pattern of the first type filler cell.

BRIEF DESCRIPTION OF THE DRAWINGS

Various embodiments will be more clearly understood from the following detailed description taken in conjunction with the accompanying drawings in which.

For convenience of illustration, the accompanying drawings may not be suitable for a scale, and elements may be illustrated to be exaggerated or reduced.

DETAILED DESCRIPTION

For convenience of illustration, the accompanying drawings may not necessarily be presented to scale, and elements may be illustrated to be exaggerated or reduced.

Figure 1:
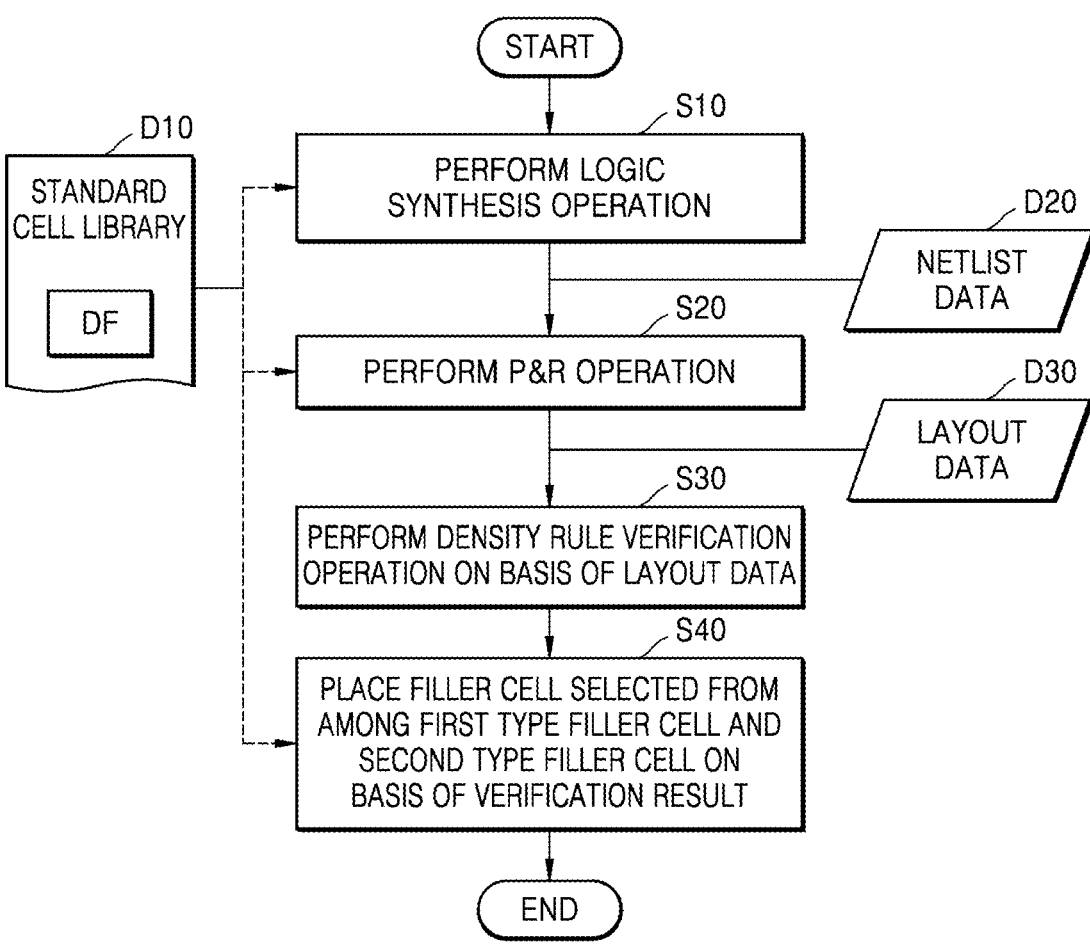
FIG. 1 is a flowchart illustrating a method of designing an integrated circuit, according to an embodiment.

FIG. 1 is a flowchart illustrating a method of designing an integrated circuit, according to an embodiment.

Referring to FIG. 1, a standard cell library D10 may include information (for example, function information, characteristic information, layout information, etc.) about a standard cell. The standard cell may be a unit of a layout included in an integrated circuit, and the integrated circuit may include various standard cells. For example, the integrated circuit may include a function cell and a filler cell. The function cell may include a standard cell where a logic element (for example, an inverter, a flip-flop, a logic gate, etc.) corresponding to the function cell is provided. The filler cell may be a standard cell that is disposed adjacent to the function cell, and thus, may provide routing of signals input to the function cell or signals output from the function cell. Also, the filler cell may include a cell used for filling a space which remains after function cells are placed.

In an embodiment, the standard cell library D10 may be a standard cell library that is modified to include data DF defining a layout of each of a plurality of filler cells. For example, the data DF may include data defining a structure of a first type filler cell where a middle-layer pattern having a relatively high density is provided, and moreover, may include data defining a structure of a second type filler cell where a middle-layer pattern having a relatively low density is provided. For example, the data DF may include data defining a structure of at least one of a first type filler cell CF1 of FIG. 5 and a first type filler cell CF1a of FIG. 7, and moreover, may include data defining a structure of a second type filler cell CF2 of FIG. 9. In an embodiment, a first type filler cell and a second type filler cell may include different middle-layer patterns, or may include the same front-end-layer pattern. In an embodiment, the first type filler cell and the second type filler cell may include different middle-layer patterns, or may include the same back-end-layer pattern. The front-end-layer pattern, a middle-end-layer pattern, and the back-end-layer pattern will be described below with reference to FIG. 4A.

In operation S10, a logic synthesis operation may be performed. For example, the logic synthesis operation may be performed to generate a gate-level netlist from input data defined in a register transfer level (RTL). For example, a semiconductor design tool (for example, a logic synthesis tool of the semiconductor design tool) may perform the logic synthesis operation with reference to the standard cell library D10 from RTL data written in a hardware description language (HDL) such as very-high-speed integrated circuit (VHSIC) hardware description language (VHDL) or Verilog, thereby generating netlist data D20 including a bitstream or a netlist. The standard cell library D10 may include information about a plurality of standard cells, and the standard cells may be added to an integrated circuit with reference to the information about the plurality of standard cells in a logic synthesis operation.

In operation S20, a place and routing (P&R) operation may be performed. For example, the place and routing operation may be performed to generate layout data D30 from the netlist data D20. The layout data D30 may have, for example, a format such as GDSII and may include geometrical information about standard cells and interconnections. The layout data D30 may include geometrical information about standard cells and wirings. Standard cells may have a structure based on a predetermined standard and may be sorted and placed in a plurality of rows.

For example, the semiconductor design tool (for example, a P&R tool of the semiconductor design tool) may place a plurality of standard cells from the netlist data D20 with reference to the standard cell library D10. The semiconductor design tool may select one layout from among layouts of a standard cell defined based on a netlist with reference to the standard cell library D10 and may place the selected layout of the standard cell.

In operation S30, a density rule verification operation may be performed based on the layout data D30. For example, a verification operation may be performed by a design rule check (DRC) tool, and the density rule verification operation may include a DRC operation. Verification result data may be output as an output file from the DRC tool. The density rule verification operation may include, for example, a first density rule verification operation of a middle-layer pattern and a second density rule verification operation of the back-end-layer pattern. In detail, in operation S30, an operation of verifying a density rule of a contact formed as the middle-layer pattern may be performed.

In some embodiments, in addition to the density rule verification operation, a verification operation such as layout versus schematic (LVS) or electrical rule check (ERC) may be further performed. In some embodiments, operation S20 may be again performed based on a result of the verification which is performed in operation S30.

In operation S40, an operation of placing a filler cell selected from among a first type filler cell and a second type filler cell may be performed based on a result of the verification which is performed in operation S30. When operation S40 is performed, layout data may be re-generated.

For example, in operation S40, an operation of placing the second type filler cell in a region where a density (for example, a density of a contact formed as a middle-layer pattern) of the middle-layer pattern is relatively high may be performed, and an operation of placing the first type filler cell in a region where a density (for example, a density of the contact formed as the middle-layer pattern) of the middle-layer pattern is relatively low may be performed.

A density of a middle-layer pattern of the first type filler cell may differ from a density of a middle-layer pattern of the second type filler cell. In an embodiment, a density of a contact, formed as the middle-layer pattern, of the first type filler cell may differ from a density of a contact, formed as the middle-layer pattern, of the second type filler cell. For example, a density of the contact, corresponding to the middle-layer pattern, of the first type filler cell may have a first value, and a density of the contact, corresponding to the middle-layer pattern, of the second type filler cell may have a second value. Here, the first value may be greater than the second value. In some embodiments, the contact as the middle-layer pattern may not be formed in the second type filler cell. That is, a density of the contact, formed as the middle-layer pattern, of the second type filler cell may be 0.

In a method of designing an integrated circuit according to an embodiment, the second type filler cell may be placed in a region where a density of a middle-layer pattern is relatively high, thereby efficiently preventing an excessive increase in density of a middle-layer pattern of the integrated circuit. For example, the first type filler cell may be advantageously placed in a region which needs the insertion of a filler cell thereinto, and then, a density of a middle-layer pattern may be verified and the first type filler cell may be substituted with the second type filler cell. Alternatively, for example, a density of a middle-layer pattern may be verified in a region which needs the insertion of a filler cell thereinto, and then, one of the first type filler cell and the second type filler cell may be selectively placed.

In a related art case where the first type filler cell and the second type filler cell having different densities of middle-layer patterns are not used but rather only a standard filler cell is used, operations of placing and routing function cells, performing density rule verification of a density of a middle-layer pattern, and then re-performing placing and routing on the basis of the density of a middle-layer pattern must be repeatedly performed. On the other hand, in a method of designing an integrated circuit according to an embodiment, an operation of checking a density of a middle-layer pattern may be performed, and the first type filler cell and the second type filler cell having different densities of middle-layer patterns may be selectively placed based on a result of the check, thereby decreasing the number of performed P&R operations and the number of operations performed for verifying a density of a middle-layer pattern.

Figure 2:
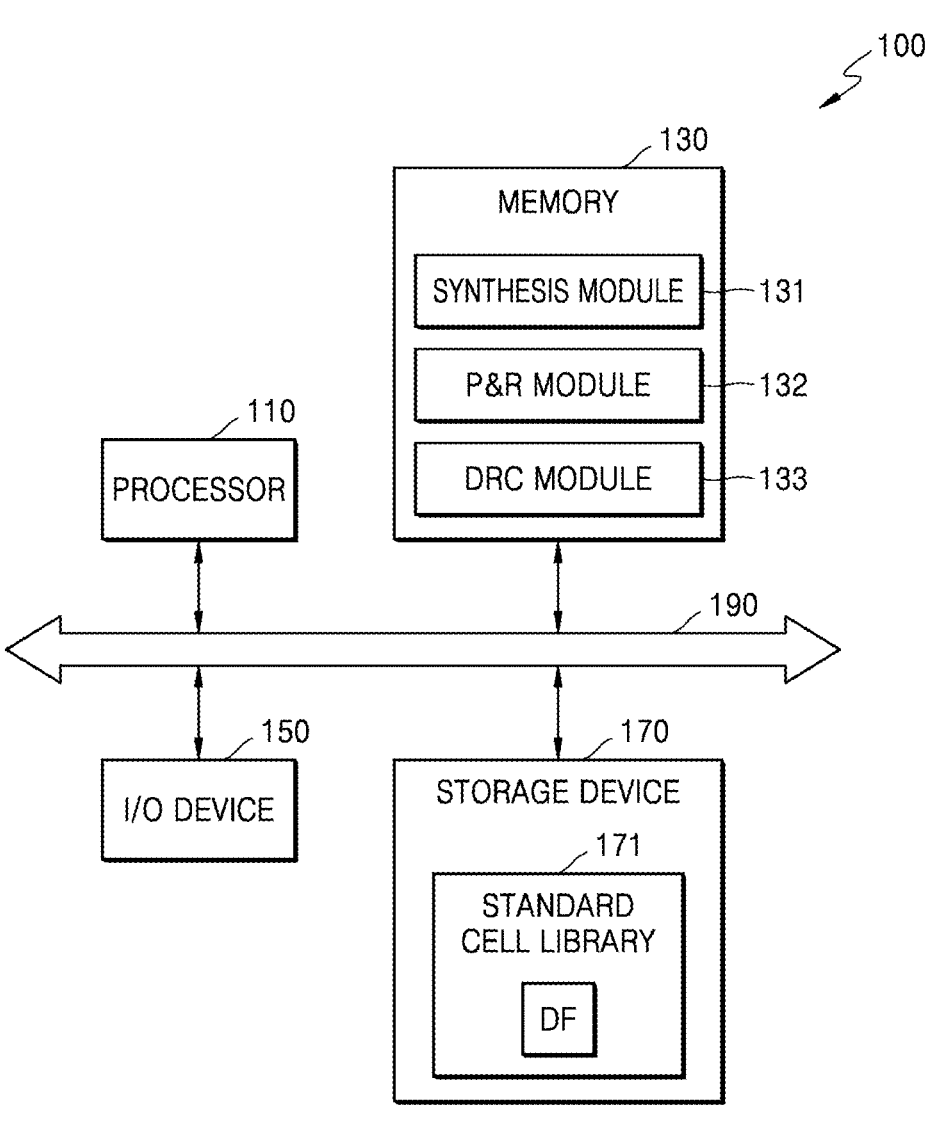
FIG. 2 is a block diagram illustrating a computing system for designing an integrated circuit according to an embodiment.

FIG. 2 is a block diagram illustrating a computing system 100 for designing an integrated circuit according to an embodiment.

Referring to FIG. 2, the computing system (hereinafter referred to as an integrated circuit design system) 100 for designing an integrated circuit may include a processor 110, a memory 130, an input/output (I/O) device 150, a storage device 170, and a bus 190. The integrated circuit design system 100 may perform an integrated circuit design operation including operations S10 to S50 of FIG. 1. In an embodiment, the integrated circuit design system 100 may be implemented as an integrated device, and thus, may be referred to as an integrated circuit design device. The integrated circuit design system 100 may be provided as a dedicated device for designing an integrated circuit of a semiconductor device, but may include a computer for driving various simulation tools or design tools, such as the semiconductor design tool and/or the design rule check (DRC) tool described above. The integrated circuit design system 100 may include a stationary computing system such as a desktop computer, a workstation, and a server or may include a portable computing system such as a laptop computer.

The processor 110 may be configured to execute instructions for performing at least one of various operations for designing an integrated circuit. For example, the processor 110 may include a core for executing an arbitrary instruction set (for example, Intel Architecture-32 (IA-32), 64 bit extension IA-32, x86-64, PowerPC, Sparc, MIPS, ARM, IA-64, etc.), like a micro-processor, an application processor (AP), a digital signal processor (DSP), and/or a graphics processing unit (GPU). The processor 110 may perform communication with the memory 130, the I/O device 150, and the storage device 170 through the bus 190. The processor 110 may drive a synthesis module 131, a P&R module 132, and a DRC module 133, which are loaded into the memory 130, thereby executing an integrated circuit design operation.

The memory 130 may store the synthesis module 131, the P&R module 132, and the DRC module 133. The synthesis module 131, the P&R module 132, and the DRC module 133 may be loaded from the storage device 170 into the memory 130. The synthesis module 131 may include, for example, a program including a plurality of instructions for performing a logic synthesis operation based on operation S20 of FIG. 1. The P&R module 132 may include, for example, a program including a plurality of instructions for performing a layout design operation based on operation S30 of FIG. 1.

The DRC module 133 may determine whether there is a design rule error. The DRC module 133 may include, for example, a program including a plurality of instructions for performing a DRC operation including a density rule verification operation based on operation S40 of FIG. 1. When an operation does not conform with a design rule, the P&R module 132 may adjust a layout of a placed cell. When there is no design rule error, an operation of designing a layout of an integrated circuit may be completed.

The memory 130 may include a volatile memory such as static random access memory (RAM) (SRAM) and/or dynamic RAM (DRAM), and/or may include a non-volatile memory such as phase change RAM (PRAM), resistive RAM (ReRAM), nano floating gate memory (NFGM), polymer RAM (PoRAM), magnetic RAM (MRAM), ferroelectric RAM (FRAM), and/or flash memory.

The I/O device 150 may control a user input and a user output each performed through user interface devices. For example, the I/O device 150 may include an input device such as a keyboard, a mouse, and a touch pad and may receive input data defining an integrated circuit. For example, the I/O device 150 may include an output device such as a display and a speaker and may display a place result, a routing result, layout data, a DRC result, etc.

The storage device 170 may store programs such as the synthesis module 131, the P&R module 132, and the DRC module 133, and before a program is executed by the processor 110, the program or at least a portion thereof may be loaded from the storage device 170 into the memory 130. The storage device 170 may also store data, which is to be processed by the processor 110, or data obtained through processing by the processor 110. For example, the storage device 170 may store data (for example, a standard cell library 171, netlist data, etc.), which is to be processed by a program such as the synthesis module 131, the P&R module 132, or the DRC module 133, or data (for example, a DRC result, layout data, etc.) generated by the program. The standard cell library 171 stored in the storage device 170 may include the standard cell library D10 modified to include the data DF of FIG. 1.

For example, the storage device 170 may include a non-volatile memory such as electrically erasable programmable read-only memory (EEPROM), flash memory, PRAM, RRAM, MRAM, and/or FRAM, and/or may include a storage medium such as a memory card (for example, multimedia card (MMC), embedded multi-media card (eMMC), secure digital (SD) card, SD, a MicroSD card), a solid state drive (SSD), a hard disk drive (HID), magnetic tape, an optical disk, and/or a magnetic disk. Also, the storage device 170 may be detachably attached on the integrated circuit design system 100.

Figure 3:
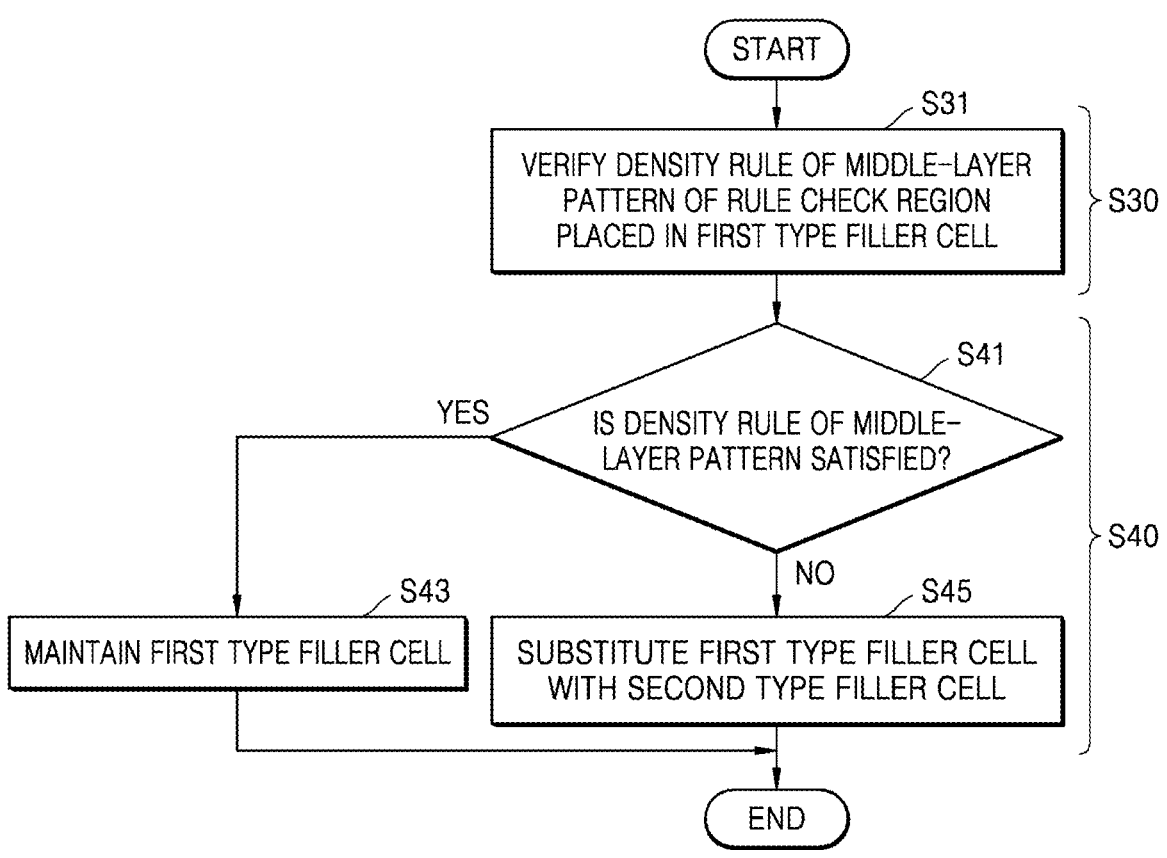
FIG. 3 is a flowchart illustrating a method of designing an integrated circuit, according to an embodiment.
Figure 4A:
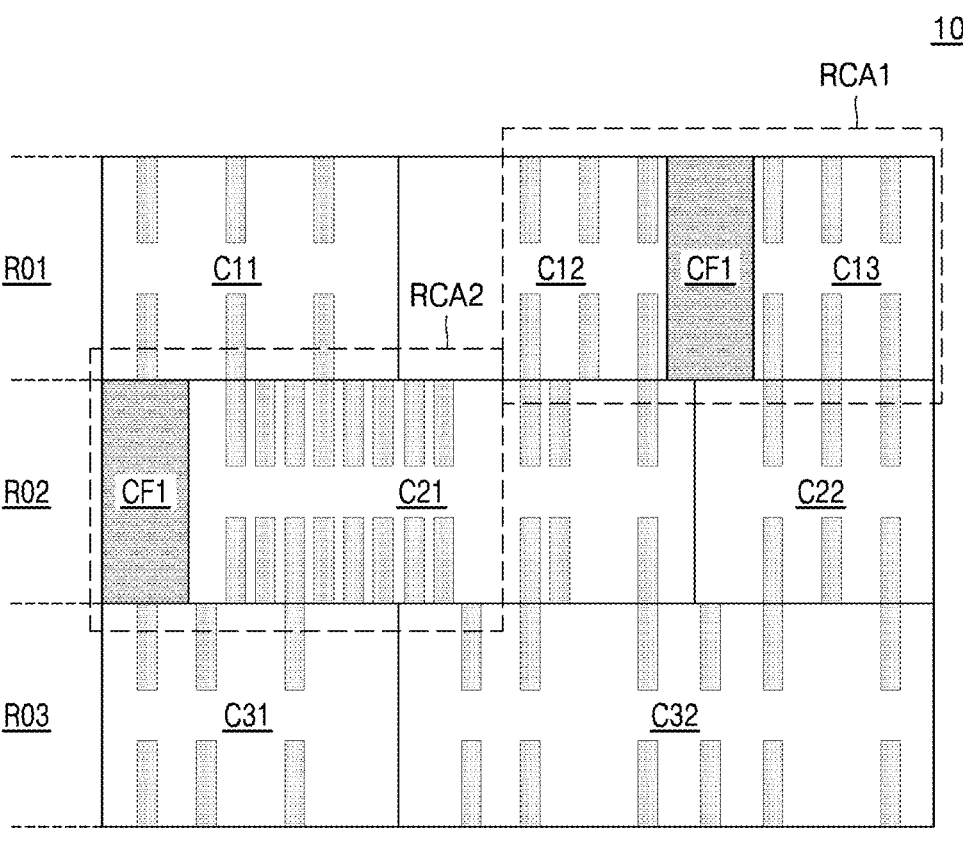
FIGS. 4A and 4B are layouts of an integrated circuit according to an embodiment and are diagrams for describing operations of FIG. 3.
Figure 4A:
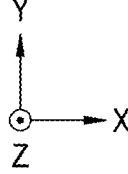
Figure 4B:
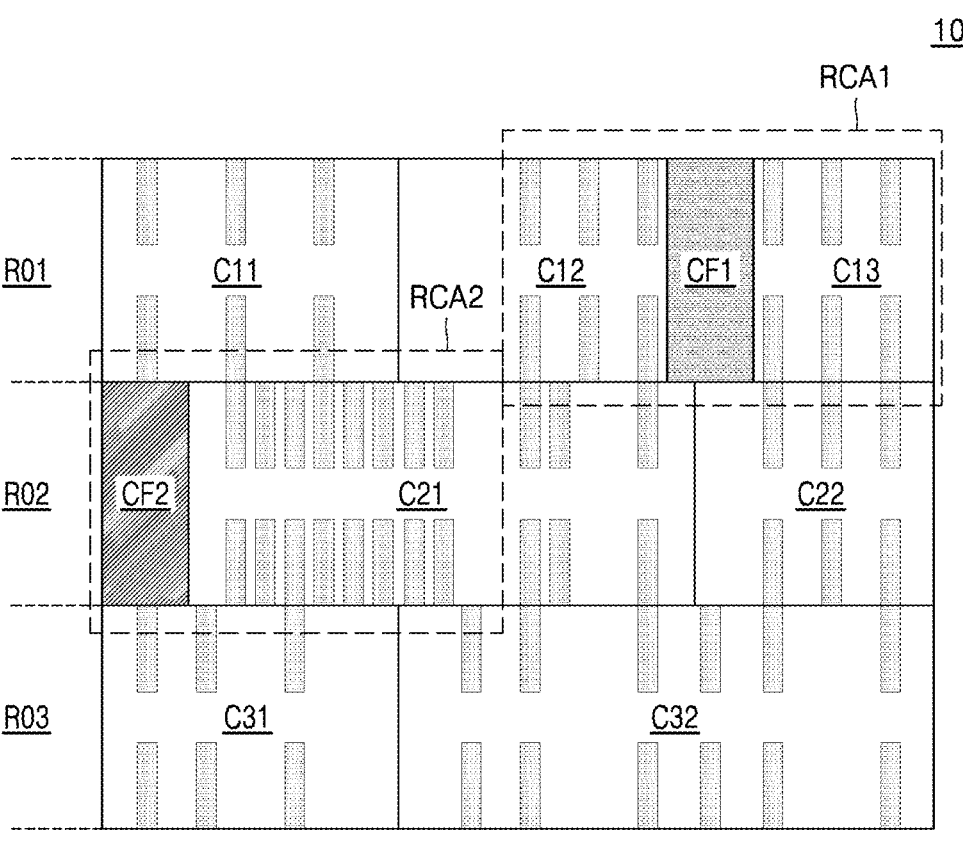
Figure 4B:
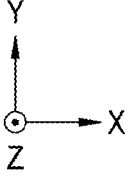

FIG. 3 is a flowchart illustrating a method of designing an integrated circuit, according to an embodiment. FIGS. 4A and 4B are layouts of an integrated circuit 10 according to an embodiment and are diagrams for describing operations of FIG. 3.

Operation S30 of FIG. 3 may be an example of operation S30 of FIG. 1, and operation S40 of FIG. 3 may be an example of operation S40 of FIG. 1. Operation S30 may include operation S31, and operation S40 may include operations S41 to S45. FIGS. 4A and 4B are plan views illustrating a layout of an integrated circuit 10 including a plurality of standard cells with respect to a plane based on an X axis and a Y axis.

Referring to FIGS. 3 and 4A, the integrated circuit 10 may include a plurality of standard cells placed in a plurality of rows. For example, the plurality of rows may include a first row R01, a second row R02, and a third row R03, as illustrated in the example of FIG. 4A. For example, the integrated circuit 10 may include a first function cell C11, a second function cell C12, and a third function cell C13 placed in the first row R01, a fourth function cell C21 and a fifth function cell C22 placed in the second row R02, and a sixth function cell C31 and a seventh function cell C32 placed in the third row R03.

Also, the integrated circuit 10 may include a plurality of filler cells. In this case, each of the plurality of filler cells may include a first type filler cell CF1. The first type filler cell CF1 may include a filler cell which is placed in operation S20 of FIG. 1 to provide routing of signals input or output from a function cell, or to fill a space remaining after function cells are placed.

Each of the plurality of standard cells placed in the integrated circuit 10 may include a front-end-layer pattern, a middle-layer pattern, and a back-end-layer pattern. A front-end layer may include a layer associated with forming of a transistor and may denote a layer which is formed by a front-end-of-line (FEOL) process of forming elements such as a transistor, a capacitor, and a resistor in a semiconductor manufacturing process. A back-end layer may include a layer (for example, a metal layer) associated with forming of a wiring which connects an input and an output between elements and may denote a layer which is formed by a back-end-of-line (BEOL) process. A middle layer may denote a layer where an element for electrically connecting a front-end layer to a back-end layer is formed. For example, a middle layer may denote a layer which is formed by a middle-of-line (MOL) process of forming a contact, a via, etc.

In operation S31, an operation of verifying a density rule of a middle-layer pattern of a rule check region with the first type filler cell CF1 placed therein may be performed. For example, a density of a middle-layer pattern (for example, a contact formed as a middle-layer pattern) may be verified in a first rule check region RCA1 and a second rule check region RCA2.

In operation S41, whether the rule density of the rule check region with the first type filler cell CF1 placed therein is satisfied may be determined. For example, the rule density may be checked for each rule check region. For example, whether the density rule is satisfied may be determined by comparing a reference value with a density of a middle-layer pattern of each of the first rule check region RCA1 and the second rule check region RCA2. The reference value may be a predetermined value and may be a condition for preventing the occurrence of a process error such as a short circuit or an opening between patterns in an MOL process.

For example, at least a portion of each of the second function cell C12 and the third function cell C13 of the first row R01 and the first type filler cell CF1 may be included in the first rule check region RCA1 where a density rule check operation is performed. The first type filler cell CF1 of the first rule check region RCA1 may be disposed between the second function cell C12 and the third function C13 so as to be adjacent to each of the second function cell C12 and the third function C13. A density of a middle-layer pattern of at least a portion of each of the second function cell C12 and the third function cell C13 each included in the first rule check region RCA1 may be relatively low, and thus, even when the first type filler cell CF1 is placed therein, the first rule check region RCA1 may satisfy a density rule.

Also, for example, at least a portion of the fourth function cell C21 of the second row R02 and the first type filler cell CF1 may be included in the second rule check region RCA2 where a density rule check operation is performed. A density of a middle-layer pattern of at least a portion of the fourth function cell C21 included in the second rule check region RCA2 may be relatively high, and thus, the second rule check region RCA2 may not satisfy the density rule.

Referring to FIGS. 3 and 4B, when the density rule is satisfied (operation S41, YES), a state where the first type filler cell CF1 is placed may be maintained in operation S43. For example, the placement of the first type filler cell CF1 may be maintained in the first rule check region RCA1.

One the other hand, when a density of a middle-layer pattern does not satisfy the density rule (operation S41, NO), the first type filler cell CF1 may be substituted with the second type filler cell CF2 in operation S45. For example, in the second rule check region RCA2, the first type filler cell CF1 may be substituted with the second type filler cell CF2, as illustrated in FIG. 4B.

A density of a middle-layer pattern of the second type filler cell CF2 may be lower than a density of a middle-layer pattern of the first type filler cell CF1. For example, a density of a contact formed in an active region of the second type filler cell CF2 may be less than a density of a contact formed in an active region of the first type filler cell CF1. In some embodiments, the second type filler cell CF2 may not include a contact contacted to the active region of the second type filler cell CF2.

In an embodiment, a pattern of a front-end-layer pattern of the second type filler cell CF2 may be the same as a pattern of a front-end-layer pattern of the first type filler cell CF1. Also, in an embodiment, a pattern of a back-end-layer pattern of the second type filler cell CF2 may be the same as a pattern of a back-end-layer pattern of the first type filler cell CF1. In other words, only the middle-layer pattern of the first and second type filler cells CF1 and CF2 may be different. Therefore, when the first type filler cell CF1 is substituted with the second type filler cell CF2, the second type filler cell CF2 may perform a function of relatively lowering a density of the middle-layer pattern thereof, and simultaneously, may function as a filler cell of a previous first type filler cell CF1.

In a method of designing an integrated circuit by using the computing system 100 of FIG. 2 according to an embodiment, the first type filler cell CF1 or the second type filler cell CF2 may be placed based on a density of a middle-layer pattern of each of function cells placed in the integrated circuit 10. In an embodiment, the first type filler cell CF1 or the second type filler cell CF2 may be placed based on a density of a middle-layer pattern of a standard cell (for example, a function cell) placed adjacent thereto. A density of a middle-layer pattern of a function cell (for example, the second function cell C12) placed adjacent to the first type filler cell CF1 may be lower than a density of a middle-layer pattern of a function cell (for example, the fourth function cell C21) placed adjacent to the second type filler cell CF2. Therefore, in the method of designing an integrated circuit according to an embodiment, the first type filler cell CF1 and the second type filler cell CF2 including middle-layer patterns having different densities may be selectively placed, and thus, a density rule of a middle-layer pattern may be satisfied.

Also, in the method of designing an integrated circuit according to an embodiment, in a case where a filler cell is placed for providing routing or in a case where a filler cell is placed for filling a residual space, the first type filler cell CF1 may be advantageously placed. Because a first type filler cell including a contact based on a middle-layer pattern is advantageously placed, middle-layer patterns placed in a function cell placed adjacent to the first type filler cell and middle-layer patterns of the first type filler cell may be successively formed, thereby increasing the utility of an MOL process.

Figure 5:
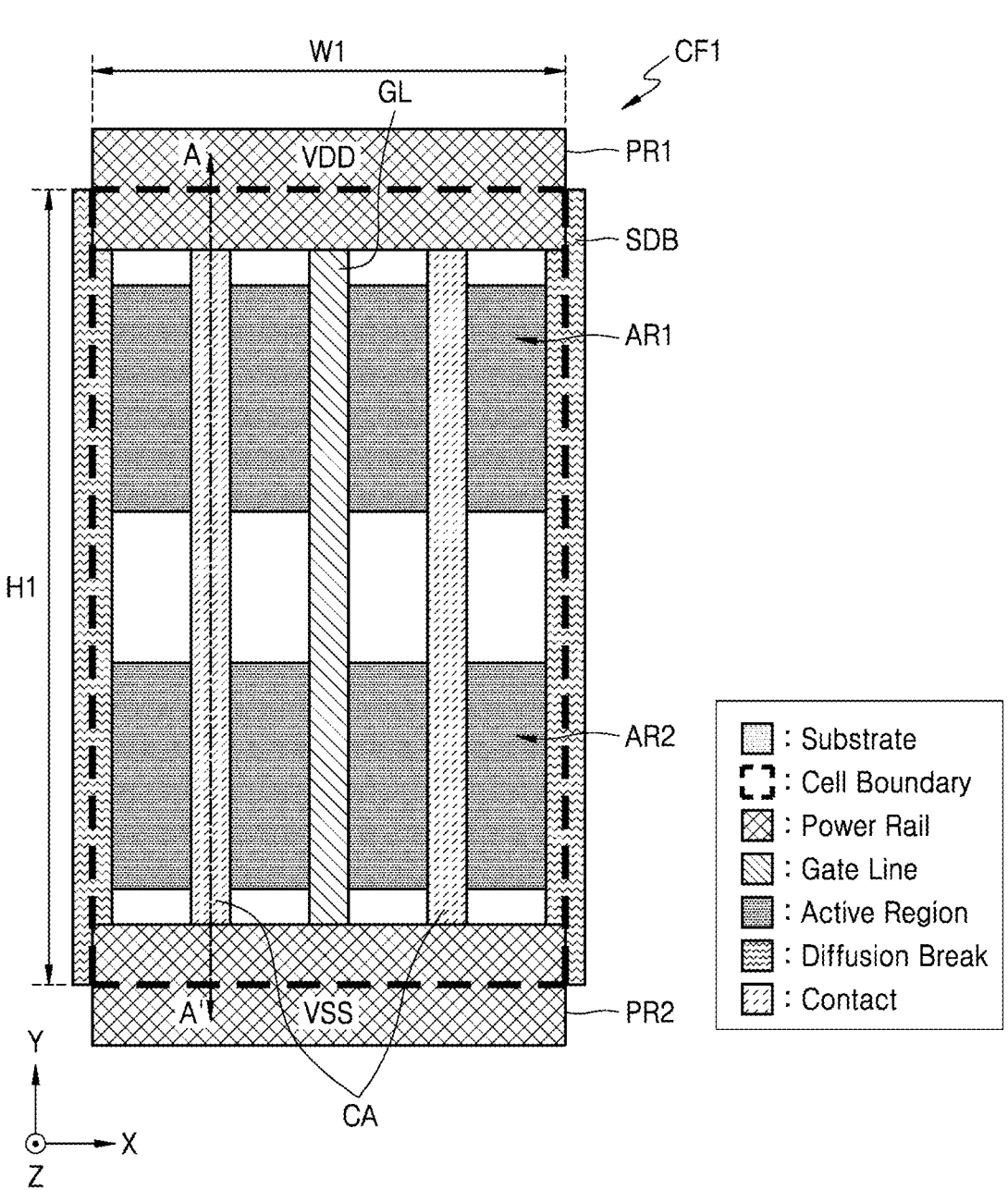
FIG. 5 is a diagram illustrating a layout of a standard cell included in an integrated circuit according to embodiments.
Figure 6:
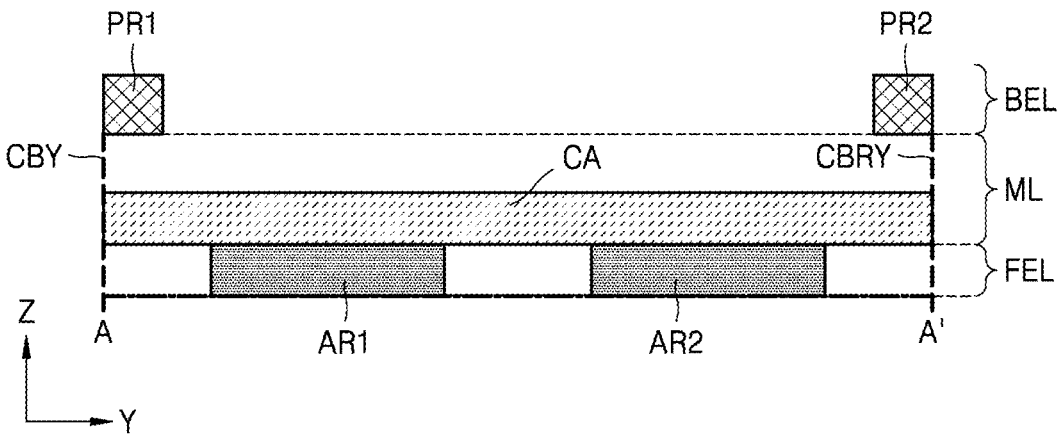
FIG. 6 is a cross-sectional view of a standard cell included in an integrated circuit according to embodiments.

FIG. 5 is a diagram illustrating a layout of a standard cell included in an integrated circuit according to embodiments. FIG. 6 is a cross-sectional view of a standard cell included in an integrated circuit according to embodiments, taken along line A-A' of FIG. 5. A standard cell CF1 illustrated in FIG. 5 may be an example of the first type filler cell CF1 placed in the second rule check region RCA2 of FIG. 4A.

Herein, a plane based on an X axis and a Y axis may be referred to as a horizontal surface, an element placed in a +Z-axis direction with respect to another element may be referred to as being placed above the other element, and an element placed in a −Z-axis direction with respect to another element may be referred to as being placed under the other element. In the drawings, for convenience of illustration, only some layers may be illustrated.

Referring to FIG. 5, an integrated circuit may include a first type filler cell CF1 limited by a cell boundary. The first type filler cell CF1 may have a first width W1 in an X-axis direction and may have a first height H1 in a Y-axis direction.

The first type filler cell CF1 may include a plurality of active regions which extend in parallel in the X-axis direction. For example, the first type filler cell CF1 may include a first active region AR1 and a second active region AR2, each of which extends in parallel with the X-axis direction. The X-axis direction may be a first direction.

In an embodiment, a plurality of fins may be formed in each of the first active region AR1 and the second active region AR2. Alternatively, in an embodiment, a plurality of nanowires may be formed in each of the first active region AR1 and the second active region AR2. Alternatively, in an embodiment, a nano-sheet may be formed in each of the first active region AR1 and the second active region AR2.

For example, the first active region AR1 and the second active region AR2 may include a semiconductor such as silicon (Si) or germanium (Ge), or may include a compound semiconductor such as SiGe, SiC, GaAs, InAs, or InP. Alternatively, each of the first active region AR1 and the second active region AR2 may include a conductive region, and for example, may include an impurity-doped well and an impurity-doped structure. For example, the first active region AR1 may be formed on a substrate and may be an N well doped with N-type impurities, and the second active region AR2 may be a substrate doped with P-type impurities. Alternatively, the second active region AR2 may be a P well doped with P-type impurities.

The first type filler cell CF1 may include at least one gate line GL extending in the Y-axis direction. The gate line may be disposed in the first active region AR1 and the second active region AR2. The gate line may form a transistor and each of the first active region AR1 and the second active region AR2. For example, a gate line may form the first active region AR1 and P-channel metal-oxide-semiconductor (PMOS) transistors, and a gate line may form the second active region AR2 and an N-channel metal-oxide-semiconductor (NMOS) transistor. The gate line may include a metal material such as tungsten (W) or tantalum (Ta), nitride thereof, silicide thereof, or doped polysilicon.

A first power rail PR1 and a second power rail PR2 may be respectively disposed at a cell boundary CBY of the first type filler cell CF1 in the Y-axis direction and a cell boundary CBRY of the first type filler cell CF1 in a −Y-axis direction (best seen in FIG. 6). The first power rail PR1 and the second power rail PR2 may extend in the X-axis direction. In the drawing, it is described that the first power rail PR1 and the second power rail PR2 are respectively disposed at the cell boundary CBY of the first type filler cell CF1 in the Y-axis direction and the cell boundary CBRY of the first type filler cell CF1 in a reverse direction of the Y-axis direction, but embodiments are not limited thereto and at least one of the first power rail PR1 and the second power rail PR2 is placed in the first type filler cell CF1.

A positive source voltage VDD may be applied to the first power rail PR1, and a ground voltage GND or a negative source voltage VSS may be applied to the second power rail PR2. Semiconductor devices formed in the first type filler cell CF1 may be electrically disconnected from the first power rail PR1 and the second power rail PR2.

The first type filler cell CF1 may include at least one contact CA which extends in the Y-axis direction. The contact CA may be placed in the first active region AR1 and the second active region AR2. The contact CA may be electrically disconnected from the first power rail PR1 and the second power rail PR2. Therefore, a transistor formed in the first type filler cell CF1 may be floated.

A diffusion break may be formed at each of a cell boundary of the first type filler cell CF1 in the X-axis direction and a cell boundary of the first type filler cell CF1 in a reverse direction of the X-axis direction. The diffusion break may electrically disconnect the first type filler cell CF1 from another standard cell (for example, the second function cell C12 and the third function cell C13 of FIG. 13) placed adjacent to the first type filler cell CF1. In an embodiment, the diffusion break may include a single diffusion break (SDB), but embodiments are not limited thereto and some embodiments may include a double diffusion break (DDB) on the basis of a structure.

Referring to FIGS. 5 and 6, the first type filler cell CF1 may include a plurality of front-end-layer patterns, a plurality of middle-layer patterns, and a plurality of back-end-layer patterns. A middle layer ML may be placed on a front-end layer FEL, and a back-end layer BEL may be placed on the middle layer ML.

The first active region AR1 and the second active region AR2 may each be formed as a front-end-layer pattern. The contact CA formed as a middle-layer pattern may be placed on the first active region AR1 and the second active region AR2. In an embodiment, a via may not be formed on the contact CA, and a top surface of the contact CA may contact an interlayer insulation layer.

In an embodiment, the contact CA may extend from the cell boundary CBY, placed in the Y-axis direction, to the cell boundary CBRY placed in the reverse direction of the Y-axis direction. That is, the contact CA may contact the cell boundary CBY in the Y-axis direction and may contact the cell boundary CBRY in the reverse direction of the Y-axis direction. However, the contact CA according to an embodiment is not limited thereto, and according to various embodiments, a shape of the contact CA may be variously implemented.

In an embodiment, the first power rail PR1 and the second power rail PR2 may each be formed as back-end-layer patterns. For example, the first power rail PR1 and the second power rail PR2 may each be formed as metal-layer patterns included in the back-end layer BEL. Also, the first type filler cell CF1 may further include a plurality of wirings, which are formed for routing on the basis of back-end-layer patterns. For example, the wirings of the first type filler cell CF1 may be connected to elements of another standard cell outside the first type filler cell CF1.

Figure 7:
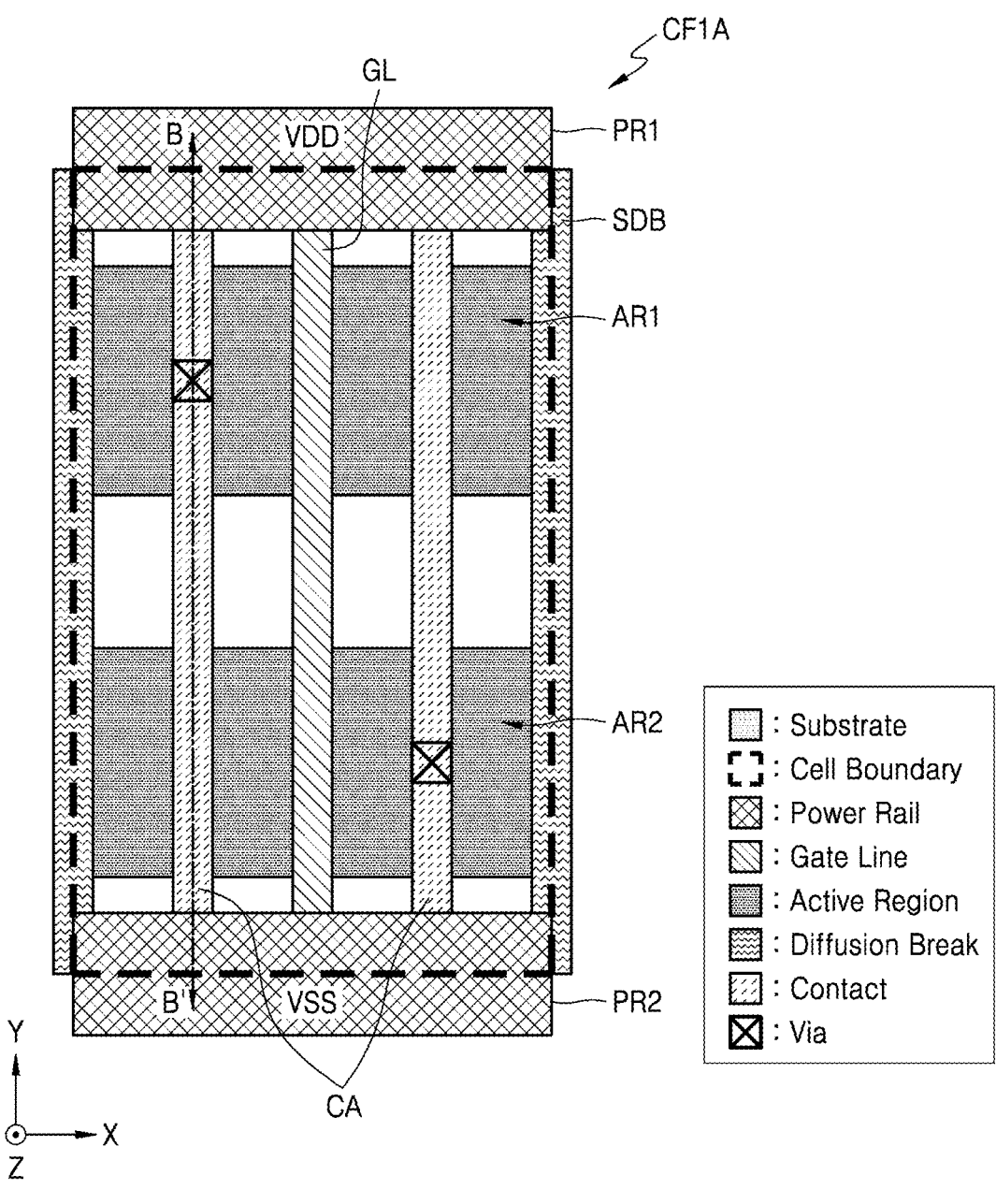
FIG. 7 is a diagram illustrating a layout of a standard cell included in an integrated circuit according to embodiments.
Figure 8:
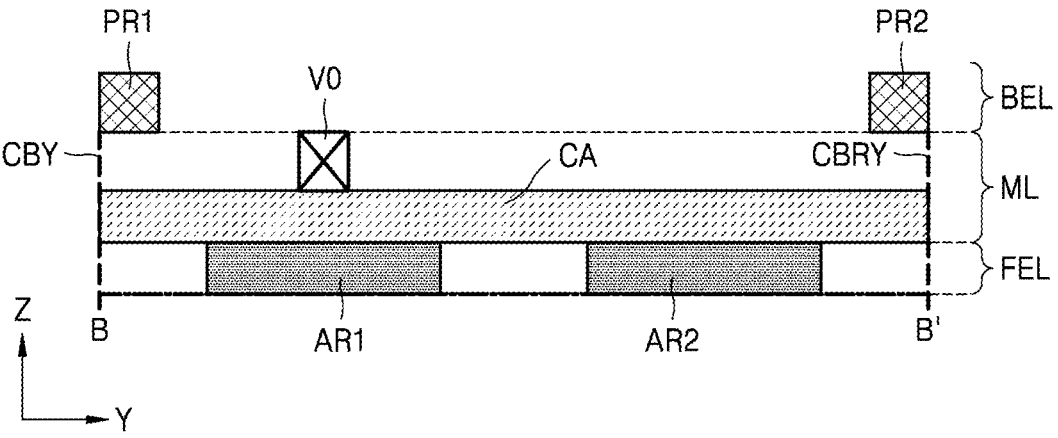
FIG. 8 is a cross-sectional view of a standard cell included in an integrated circuit according to embodiments.

FIG. 7 is a diagram illustrating a layout of a standard cell included in an integrated circuit according to embodiments. FIG. 8 is a cross-sectional view of a standard cell included in an integrated circuit according to embodiments, taken along line B-B' of FIG. 7. A standard cell CF1A illustrated in FIG. 7 may be an example of the first type filler cell CF1 placed in the second rule check region RCA2 of FIG. 4A. In descriptions of FIGS. 7 and 8, descriptions which are the same as or similar to the descriptions of FIGS. 5 and 6 are omitted for conciseness.

Referring to FIGS. 7 and 8, the first type filler cell CF1A may include a plurality of front-end-layer patterns, a plurality of middle-layer patterns, and a plurality of back-end-layer patterns. A middle layer ML may be placed on a front-end layer FEL, and a back-end layer BEL may be placed on the middle layer ML.

The first type filler cell CF1A may further include a via V0 which is formed on the contact CA, as a middle-layer pattern. The via V0 may not electrically be connected to a back-end-layer pattern and may be electrically disconnected therefrom. However, unlike the illustration of FIG. 7, in some embodiments, a back-end-layer pattern may be placed on the via V0, and the via V0 may be connected to the back-end-layer pattern.

In an embodiment, the front-end-layer patterns formed in the first type filler cell CF1A may be the same as the front-end-layer patterns of the first type filler cell CF1 of FIG. 5. Also, in an embodiment, the back-end-layer patterns formed in the first type filler cell CF1A may be the same as the back-end-layer patterns of the first type filler cell CF1 of FIG. 5.

Figure 9:
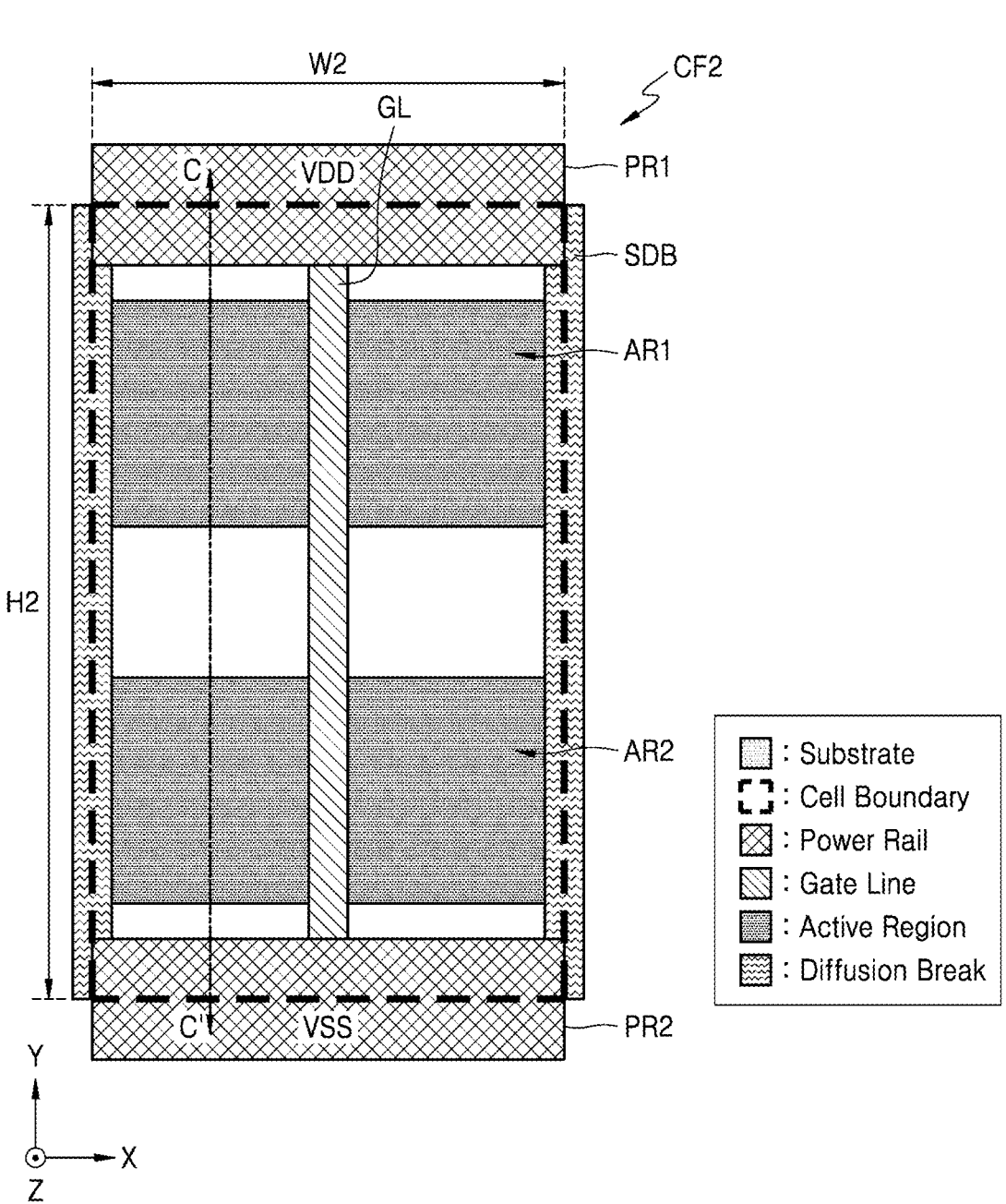
FIG. 9 is a diagram illustrating a layout of a standard cell included in an integrated circuit according to embodiments.
Figure 10:
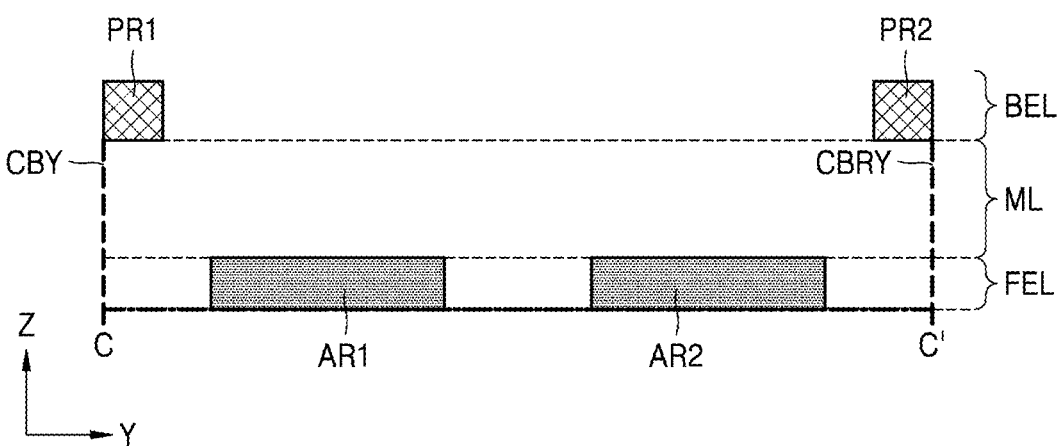
FIG. 10 is a cross-sectional view of a standard cell included in an integrated circuit according to embodiments.

FIG. 9 is a diagram illustrating a layout of a standard cell included in an integrated circuit according to embodiments. FIG. 10 is a cross-sectional view of a standard cell included in an integrated circuit according to embodiments, taken along line C-C' of FIG. 9. A standard cell CF2 illustrated in FIG. 9 may be an example of the second type filler cell CF2 placed in the second rule check region RCA2 of FIG. 4B. In descriptions of FIGS. 9 and 10, descriptions which are the same as or similar to the descriptions of FIGS. 5 and 6 are omitted.

Referring to FIGS. 9 and 10, an integrated circuit may include a second type filler cell CF2 limited by a cell boundary. The second type filler cell CF2 may have a second width W2 in an X-axis direction and may have a second height H2 in a Y-axis direction. In an embodiment, the second width W2 of the second type filler cell CF2 may be the same as the first width W1 of the first type filler cell CF1 of FIG. 5, and the second height H2 of the second type filler cell CF2 may be the same as the first height H1 of the first type filler cell CF1 of FIG. 5. However, embodiments are not limited thereto and, in some embodiments, the second width W2 may be different than the first width W1, and/or the second height H2 may be different than the first height H1.

The second type filler cell CF2 may include a plurality of front-end-layer patterns and a plurality of back-end-layer patterns. A density of a middle-layer pattern of the second type filler cell CF2 may be lower than a density of the middle-layer pattern of the first type filler cell CF1 of FIG. 5. Also, a density of the middle-layer pattern of the second type filler cell CF2 may be lower than a density of the middle-layer pattern of the first type filler cell CF1A of FIG. 7.

In an embodiment, the second type filler cell CF2 may not include a plurality of middle-layer patterns. That is, in the second type filler cell CF2, a contact placed on a first active region AR1 and a second active region AR2 may not be formed, a density of a middle-layer pattern may be 0, and a density of a contact may be 0. Therefore, a cell boundary CBY of the second type filler cell CF2 in a Y-axis direction may not contact the contact, namely, may be apart from the contact. The second type filler cell CF2 may not terminate at the contact. Also, a cell boundary CBRY of the second type filler cell CF2 in a reverse direction of the Y-axis direction may not contact the contact, and the second type filler cell CF2 may not terminate at the contact.

In an embodiment, the front-end-layer patterns formed in the second type filler cell CF2 may be the same as the front-end-layer patterns of the first type filler cell CF1 of FIG. 5. Also, in an embodiment, the back-end-layer patterns formed in the second type filler cell CF2 may be the same as the back-end-layer patterns of the first type filler cell CF1 of FIG. 5.

Figure 11:
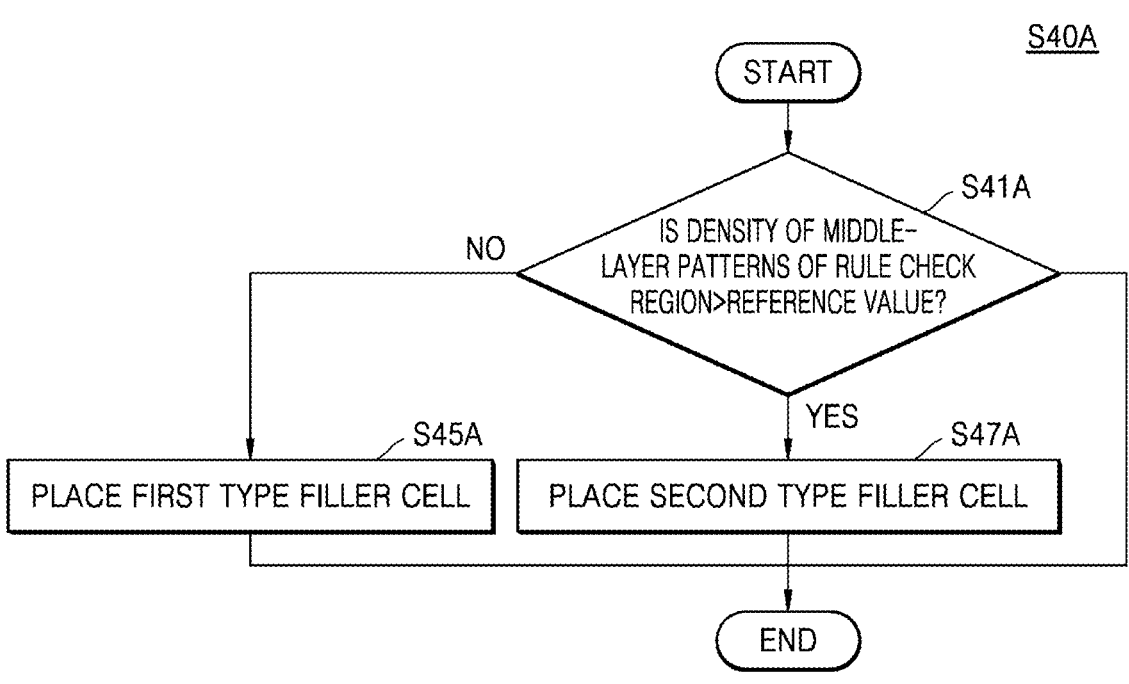
FIG. 11 is a flowchart illustrating a method of designing an integrated circuit, according to an embodiment.

FIG. 11 is a flowchart illustrating a method of designing an integrated circuit, according to an embodiment. Operation S40A of FIG. 11 may be an example of operation S40 of FIG. 1. In other words, the flowchart includes the operations S10-S30 in FIG. 1 but with operation S40 of FIG. 1 replaced by operation S40A. Repeated description of operations S10-S30 is omitted for conciseness.

Referring to FIG. 11, in operation S41A, it is determined whether a density of middle-layer patterns of a rule check region is greater than a reference value. For example, whether a density of a middle-layer pattern of a rule check region, including a region into which a filler cell is to be inserted, is greater than a reference value may be determined. For example, whether a density of a middle-layer pattern of each of standard cells, placed adjacent to a region (for example, at least one of the first rule check region RCA1 and the second rule check region RCA2) where a filler cell is to be placed in an empty space after function cells are placed, is greater than the reference value may be determined.

Alternatively, for example, whether a density of a middle-layer pattern of each of standard cells, placed adjacent to a region (for example, at least one of the first rule check region RCA1 and the second rule check region RCA2) where a filler cell is to be placed for facilitating routing between function cells, is greater than the reference value may be determined.

When a density of the middle-layer pattern is equal to or less than the reference value (operation S41A, NO), a first type filler cell may be placed in operation S45A. On the other hand, when a density of the middle-layer pattern is greater than the reference value (operation S41A, YES), a second type filler cell may be placed in operation S47A.

A density of a middle-layer pattern of the second type filler cell may be less than a density of a middle-layer pattern of the first type filler cell. For example, a density of a contact formed on an active region of the second type filler cell may be less than a density of a contact formed on an active region of the first type filler cell. In an embodiment, the second type filler cell may not include a plurality of contacts, and therefore a density of a contact may be 0.

For example, the first type filler cell may include one of the first type filler cell CF1 of FIG. 5 and the first type filler cell CF1A of FIG. 7. The second type filler cell may include the second type filler cell CF2 of FIG. 9.

In a method of designing an integrated circuit by using the computing system 100 of FIG. 2 according to an embodiment, the first type filler cell or the second type filler cell may be placed based on a density of a middle-layer pattern of each of function cells placed in the integrated circuit. Therefore, a density of a middle-layer pattern of a whole integrated circuit may be prevented from increasing excessively, and a density rule may be satisfied.

Also, in a method of designing an integrated circuit, according to an embodiment, a first type filler cell and a second type filler cell having different densities of middle-layer patterns may be selectively placed, thereby decreasing the number of design rule check operations performed for limiting a density of a middle-layer pattern and decreasing the number of performed P&R operations.

Figure 12:
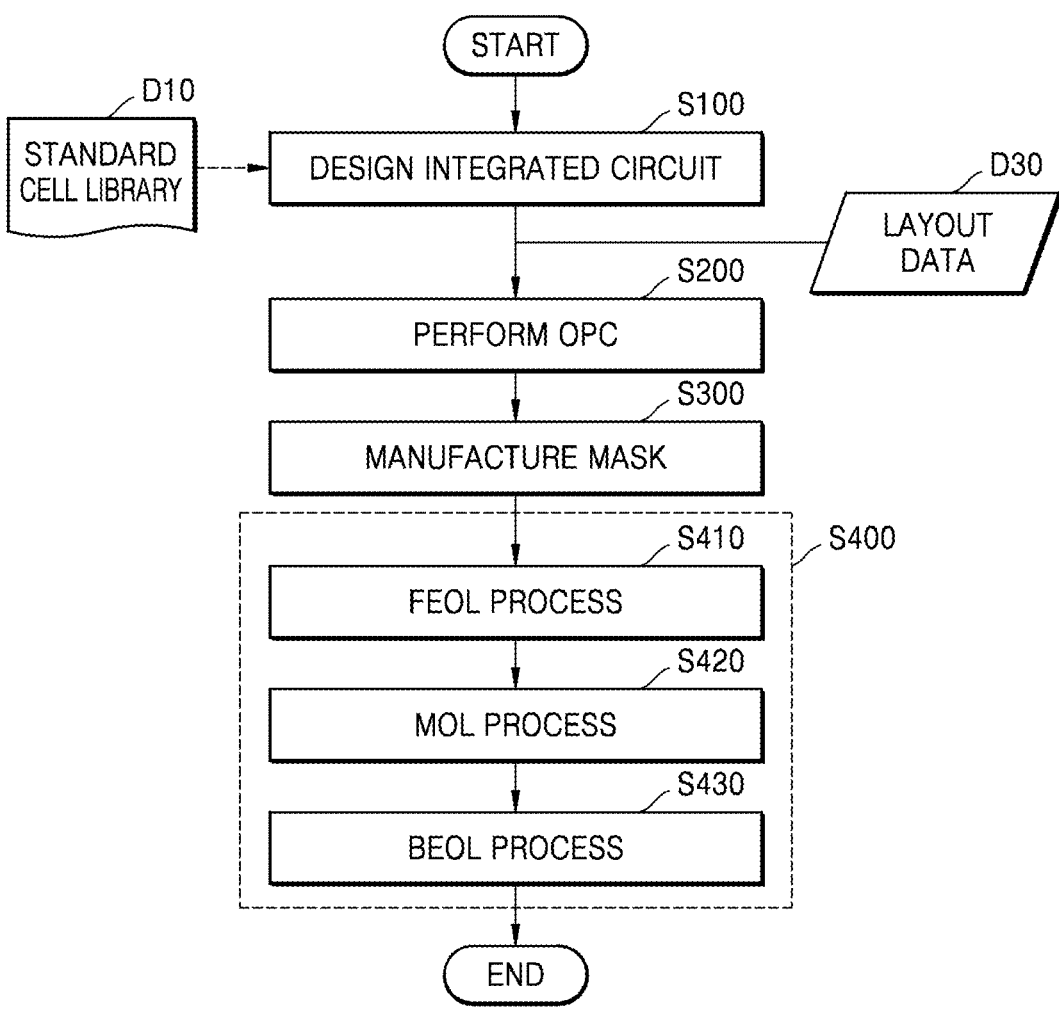
FIG. 12 is a flowchart illustrating a method of manufacturing an integrated circuit, according to an embodiment.

FIG. 12 is a flowchart illustrating a method of manufacturing an integrated circuit, according to an embodiment.

A standard cell library D10 may include information (for example, function information, characteristic information, layout information, etc.) about a plurality of standard cells. For example, the standard cell library D10 may include information about at least one of the first type filler cell CF1 of FIG. 5 and the first type filler cell CF1A of FIG. 7, and may include information about the second type filler cell CF2 of FIG. 9. That is, the standard cell library D10 may be the standard cell library described with respect to FIG. 1.

Referring to FIG. 12, in operation S100, an operation of designing an integrated circuit may be performed, and layout data D30 may be generated. For example, the operation may be performed by a processor by using a tool for designing an integrated circuit. In an embodiment, operation S100 may include operations S10 to S40 of FIG. 1, and a repeated description thereof is omitted for conciseness.

In operation S200, an optical proximity correction (OPC) operation may be performed. The OPC operation may denote an operation of forming a pattern having a desired shape by correcting distortion such as refraction caused by a characteristic of light in a photolithography process included in a semiconductor process of manufacturing an integrated circuit, and a pattern of a mask may be determined by applying the layout data D30 to the OPC operation.

In operation S300, an operation of manufacturing a mask may be performed. For example, a plurality of patterns formed in a plurality of layers may be defined based on the layout data D30, and at least one mask (or photomask) for forming patterns of each of the plurality of layers may be manufactured.

In operation S400, an operation of manufacturing the integrated circuit may be performed. For example, a plurality of layers may be patterned by using the at least one mask which is manufactured in operation S300, and thus, the integrated circuit may be manufactured. Operation S400 may include operations S410 to S430.

In operation S410, a front-end-of-line (FEOL) process may be performed. The FEOL process may denote a process of forming individual elements (for example, a transistor, a capacitor, a resistor, etc.) in a substrate in an integrated circuit manufacturing process. For example, the FEOL process may include an operation of planarizing and cleaning a wafer, an operation of forming a trench, an operation of forming a well, an operation of forming a gate line, and an operation of forming a source and a drain.

In operation S420, a middle-of-line (MOL) process may be performed. The MOL process may denote a process of forming a connection member for connecting the individual elements, formed through the FEOL process, in a standard cell. For example, the MOL process may include an operation of forming a contact on an active region and an operation of forming a via on the contact.

In operation S430, a back-end-of-line (BEOL) process may be performed. The BEOL process may denote a process of connecting the individual elements (for example, the transistor, the capacitor, the resistor, etc.) in the integrated circuit manufacturing process. For example, the BEOL process may include an operation of adding a metal layer, an operation of forming a via in the metal layer, an operation of forming a passivation layer, and a planarization operation. Subsequently, the integrated circuit may be packaged into a semiconductor package and may be used as an element of each of various applications.

While various embodiments have been particularly shown and described herein, it will be understood that various changes in form and details thereof may be made therein without departing from the spirit and scope of the following claims.

What is claimed is:

1. An integrated circuit comprising:
a plurality of standard cells defined by a cell boundary and connected to one another through a plurality of metal-layer patterns,
wherein each of the plurality of standard cells comprises:
a plurality of function cells each including a logic circuit; and
a plurality of filler cells, each placed adjacent to at least one of the plurality of function cells,
each of the plurality of filler cells comprises one of a first type filler cell in which an active region extending in a first direction is formed and a second type filler cell in which an active region extending in the first direction is formed, and
a density of a contact formed between a corresponding metal-layer pattern and the active region of the first type filler cell to contact the active region of the first type filler cell is greater than a density of a contact formed between a corresponding metal-layer pattern and the active region of the second type filler cell to contact the active region of the second type filler cell,
wherein each of the first type filler cell and the second type filler cell provide routing space for a signal for adjacent ones of the plurality of standard cells,
wherein the plurality of function cells comprise a first function cell in which an active region extending in the first direction is formed and a second function cell in which an active region extending in the first direction is formed,
in the first function cell placed adjacent to the first type filler cell, a density of a contact formed between a corresponding metal-layer pattern and the active region of the first function cell to contact the active region of the first function cell has a first value,
in the second function cell placed adjacent to the second type filler cell, a density of a contact formed between a corresponding metal-layer pattern and the active region of the second function cell to contact the active region of the second function cell has a second value, and
the first value is less than the second value.

2. The integrated circuit of claim 1, wherein the first type filler cell comprises:
a gate line extending in a second direction vertical to the first direction; and
a contact spaced apart from the gate line in the first direction.

3. The integrated circuit of claim 1, wherein a cell boundary of the first type filler cell in a second direction contacts a cross-sectional surface of the contact included in the first type filler cell.

4. The integrated circuit of claim 1, wherein the contact included in the first type filler cell extends from a cell boundary of the first type filler cell in a second direction to a cell boundary of the first type filler cell in a reverse direction of the second direction.

5. The integrated circuit of claim 1, wherein the contact is not formed in the second type filler cell.

6. The integrated circuit of claim 1, wherein the first type filler cell further comprises a via formed on the contact.

7. The integrated circuit of claim 1, wherein a shape of the active region of the first type filler cell is a same shape as a shape of the active region of the second type filler cell.

8. An integrated circuit comprising:
    a plurality of standard cells defined by a cell boundary and connected to one another through a plurality of metal-layer patterns,
    wherein each of the plurality of standard cells comprises:
    a plurality of function cells each including a logic circuit; and
    a plurality of filler cells, each placed adjacent to at least one of the plurality of function cells,
    each of the plurality of filler cells comprises one of a first type filler cell in which an active region extending in a first direction is formed and a second type filler cell in which an active region extending in the first direction is formed, and
    wherein each of the plurality of filler cells comprises:
        a front-end layer in which a pattern configuring a transistor is formed;
        a back-end layer in which a routing pattern providing routing of signals to another standard cell is formed; and
        a middle layer formed between the front-end layer and the back-end layer, and
    a density of a middle-layer pattern of the second type filler cell is lower than a density of a middle-layer pattern of the first type filler cell,
    wherein a plurality of wirings of each of the first type filler cell and the second type filler cell provide the routing of signals for adjacent ones of the plurality of standard cells,
    wherein the plurality of function cells comprise a first function cell in which an active region extending in the first direction is formed and a second function cell in which an active region extending in the first direction is formed,
    in the first function cell placed adjacent to the first type filler cell, a density of a contact formed between a corresponding metal-layer pattern and the active region of the first function cell to contact the active region of the first function cell has a first value,
    in the second function cell placed adjacent to the second type filler cell, a density of a contact formed between a corresponding metal-layer pattern and the active region of the second function cell to contact the active region of the second function cell has a second value, and
    the first value is less than the second value.

9. The integrated circuit of claim 8, wherein a front-end-layer pattern of the first type filler cell is a same pattern as a front-end-layer pattern of the second type filler cell.

10. The integrated circuit of claim 8, wherein the middle-layer pattern of the first type filler cell comprises a contact contacting an active region of the transistor.

11. The integrated circuit of claim 10, wherein the first type filler cell further comprises a via formed on the contact.

12. The integrated circuit of claim 8, wherein the middle-layer pattern of the second type filler cell does not comprise a contact contacting an active region of the transistor.

13. The integrated circuit of claim 8, wherein the density of the middle-layer pattern of the middle layer of the second type filler cell is 0.

14. The integrated circuit of claim 8, wherein a back-end-layer pattern of the first type filler cell is a same pattern as a back-end-layer pattern of the second type filler cell.

15. An integrated circuit comprising:
    a plurality of standard cells defined by a cell boundary and connected to one another through a plurality of metal-layer patterns,
    wherein each of the plurality of standard cells comprises:
    a plurality of function cells each including a logic circuit; and
    a plurality of filler cells, each placed adjacent to at least one of the plurality of function cells,
    each of the plurality of filler cells comprises one of a first type filler cell in which an active region extending in a first direction is formed and a second type filler cell in which an active region extending in the first direction is formed,
    wherein the first type filler cell and the second type filler cell are configured to have different structures between the active regions and the plurality of metal-layer patterns, the different structures electrically connecting the active regions and the plurality of metal-layer patterns,
    wherein each of the first type filler cell and the second type filler cell provide routing space for a signal for adjacent ones of the plurality of standard cells,
    wherein the plurality of function cells comprise a first function cell in which an active region extending in the first direction is formed and a second function cell in which an active region extending in the first direction is formed,
    in the first function cell placed adjacent to the first type filler cell, a density of a contact formed between a corresponding metal-layer pattern and the active region of the first function cell to contact the active region of the first function cell has a first value,
    in the second function cell placed adjacent to the second type filler cell, a density of a contact formed between a corresponding metal-layer pattern and the active region of the second function cell to contact the active region of the second function cell has a second value, and
    the first value is less than the second value.

16. The integrated circuit of claim 15, wherein the first type filler cell comprises a contact formed between the active region and the plurality of metal-layer patterns to contact the active region,
    and wherein the second type filler cell does not comprise a contact between the active region and the plurality of metal-layer patterns.

17. The integrated circuit of claim 16, wherein the first type filler cell further comprises a via formed on the contact.

18. The integrated circuit of claim 15, wherein a cell boundary defining the second type filler cell is spaced apart from the contact of the second type filler cell.

19. The integrated circuit of claim 15,
    wherein a metal layer of the first type filler cell and a metal layer of the second type filler cell have a same shape.

* * * * *